Dec. 8, 1936.     C. JOHNSON     2,063,313
PRESSURE MEASURING DEVICE
Original Filed Nov. 28, 1930
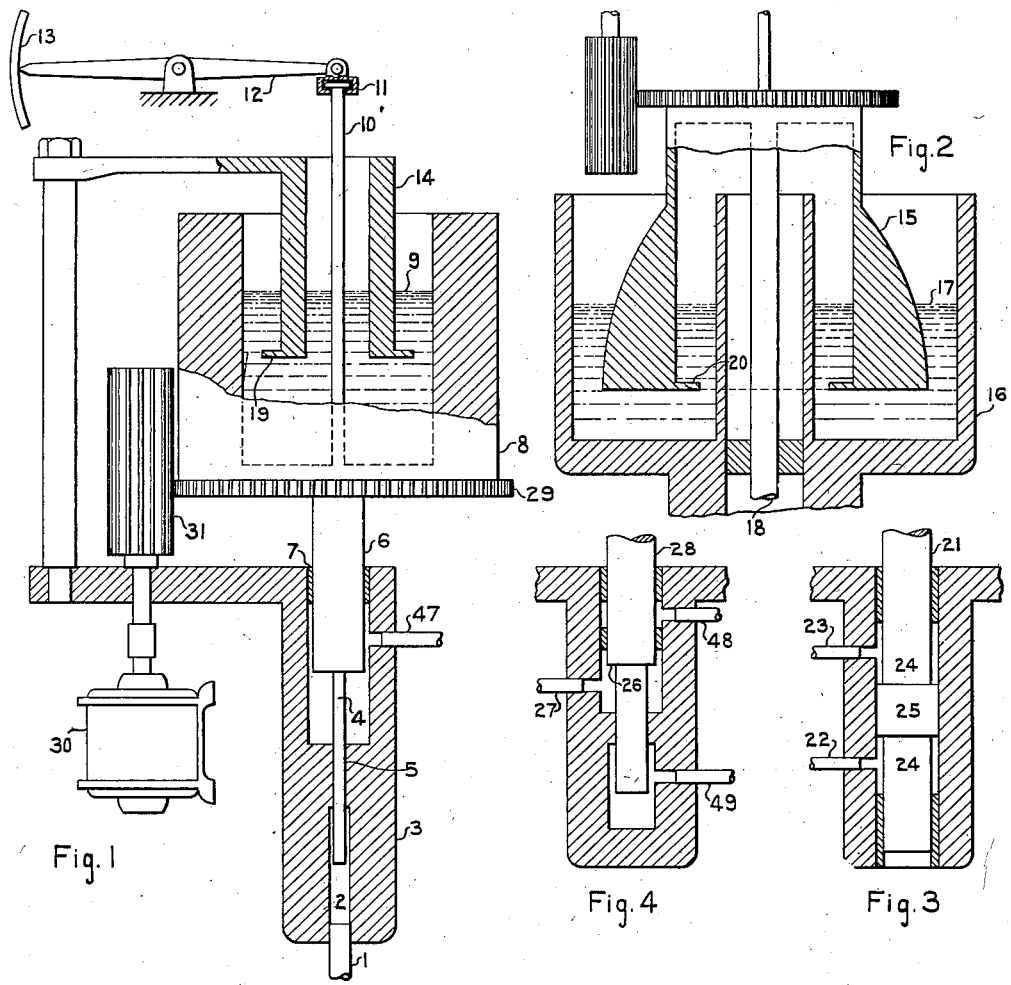
INVENTOR
Clarence Johnson
BY
Raymond D. Junkins
ATTORNEY Patented Dec. 8, 1936

2,063,313

UNITED STATES PATENT OFFICE 2,063,313

PRESSURE MEASURING DEVICE

Clarence Johnson, East Cleveland, Ohio, assignor to Bailey Meter Company, a corporation of Delaware Original application November 28, 1930, Serial No. 498,592. Divided and this application May 4, 1934, Serial No. 723,939

10 Claims. (Cl. 73—111)

This invention relates to pressure measuring devices and especially to that class of pressure responsive or measuring devices of a loaded piston type, characterized by the positioning of a piston in a cylinder through the application to the piston of a pressure or pressure differential, and where the pressure so applied is counterbalanced by a weight or other means. By "pressure differential" I mean any two pressures of which one may be the pressure of the atmosphere.

The subject matter of this application is a division of my co-pending application in the United States Patent Office, Serial No. 498,592, filed November 28, 1930, for "Pressure measuring device".

The problem with which my invention is primarily concerned and where it finds its widest application is in the measurement of relatively high pressures. For example, pressures of the order of 500 to 2000 lb. per sq. in. gage; but its use is, of course, not limited to such pressures. In many cases it is desired to indicate or to use only a small part of a total pressure range. For example, if a steam turbine is to operate with steam at 1300 lb. gage and the variation in pressure from 1300 lb. is desirably not more than plus or minus 10 lb., then an indicator of the pressure should have full range travel of, say, 1290 to 1310 lb. In the past it has been practically impossible to obtain an indicator or pressure responsive device which would accomplish this with accuracy or permanency. The well known Bourdon tube, if strong enough to withstand the 1310 lb. pressure, would not be sensitive enough to give accurate indications of variations within the desirable 20 lb. range. Conversely, if weak enough to be sensitive and accurate on a 20 lb. range, then the Bourdon tube would stretch or rupture when the high pressure was applied. With my invention I have been able to produce a pressure responsive device which suppresses, or is not sensitive to, the major portion of a high pressure and which produces a large indicator motion for the remaining portion with a high degree of accuracy. In fact, for the example given, I have been able to indicate a pressure range of 1290 to 1310 lb. readable to a twentieth of a pound and accurate to a tenth of a pound.

Certain forms of piston pressure measuring devices have been known in the past as "dead weight testers", but they have, so far as I am aware, certain limitations. A fixed or dead weight applied to one end of the piston has been used to counterbalance a pressure applied to the other end of the piston and the value of the pressure to be measured is then read by the amount of dead weight applied. For a different pressure, a different dead weight must be applied.

One object of my invention is to provide such a pressure measuring device with a counterweight or counterbalancing means automatically varying as the pressure varies to balance the same.

Another object is to minimize the static friction or resistance to positioning of the piston and the counterbalancing means.

A further object is to provide indicating means of the pressure or pressure differential.

Still another object is to position a member in accordance with variations in pressure or pressure differential, either directly or by increments bearing a functional or other desirable relation to the pressure variations.

An important object is to provide that the indication or positioning may be of only a portion of the pressure or pressure differential applied to the piston.

With these and further objects in view, the invention consists in the arrangement and combination of the parts hereinafter described and claimed.

In the drawing:

Fig. 1 is an elevation, partly in section, of a loaded piston pressure measuring device having variable counterbalancing means.

Fig. 2 is a sectional elevation of a part of a device such as is illustrated in Fig. 1, having a somewhat different arrangement of parts.

Figs. 3 and 4 are views of two types of pistons upon which the pressure or pressure differential may be effective.

Referring first to Fig. 1, I have illustrated an arrangement wherein the pressure to be measured is opposed by a variable counterweighting effect and is visually indicated. It is not necessary with my invention to add or subtract dead weight when the pressure varies, as this is automatically accomplished by the variable counterweighting and rather than having to count or add up the weight applied, as in the well known dead weight tester, the amount of pressure is continuously indicated. Pressure transmitting fluid may be introduced into a chamber 2 through a pipe 1. The pressure fluid so admitted is effective for positioning a piston 4 which extends through a close fitting section 5 into the chamber 2. The piston 4 extends beyond the section 5 to a space at atmospheric pressure and is formed with an enlargement 6 guided and supported by a bushing 7, and still further to form an enlargement comprising a chamber 8 wherein is a liquid 9 in the preferred form, being mercury. Passing through the mercury as an axial extension of the piston and positioned with the piston, as is the chamber 8, is a rod 10 which may be, through a suitable connection 11, adapted to act upon one end of a fulcrumed beam 12, the other end of which cooperates with an index 13; or the rod 10 may be otherwise used to visually indicate the position of the piston 4 corresponding at any point to a definite pressure within the chamber 2 relative to the atmosphere.

The variable counterbalancing or counterweighting means for the pressure and the piston 4 upon which the pressure is effective, include a displacer 14 rigidly fixed to the casing 3 and adapted to depend into the mercury 9, to the end that the buoyant effect of said displacer submerged in varying amounts in the mercury effects a varying counterbalancing or counterweighting of the piston.

The upward force of the pressure to be measured applied through the pressure connection 1 to the piston 4, is counterbalanced by two downwardly acting force components, the one a constant amount comprising the dead weight of the assembly of parts 4, 6, 8, 9 and 10, and the other the reaction effect of the variable buoyant force exerted by the displacer upon the mercury. This buoyant effect, varying with the amount of immersion of the displacer, is of course zero at the lowest assembly position where the displacer just touches the mercury, and when atmospheric pressure exists in the chamber 2; gradually increasing to a maximum as the chamber 8 rises to its highest position. As the pressure applied at 2 increases above atmosphere, movement of the piston 4 is opposed by the first-mentioned downwardly acting force component. As the pressure overcomes this constant amount, the assembly of piston and chamber moves upward and the mercury encounters the displacer; the displacer becoming an added weight and effecting a variable counterbalancing force, to the end that above the base pressure or that pressure necessary to overcome the constant weight, each increment of pressure added results in an increment of motion of the piston. If no such counterbalancing were present, then when the applied pressure slightly exceeded that necessary to overcome the constant weight, the weight assembly would move upward and continue to so move unless additional dead weight were added. By providing a variable counterweight effective in variable degree with applied pressure, the result is a definite position for every applied pressure above the base pressure.

By changing the constant weight of piston, chamber and mercury and taking into account the piston area on which the pressure is applied, the base pressure may be varied. This is commonly called the suppressed pressure and is an amount which must be applied to a pressure measuring or pressure responsive device, such as the one being described, before movement of the indicator begins. The added pressure required to move the assembly to the desired upper limit of travel, and correspondingly, the indicator to its desired maximum travel, will depend on the amount of mercury displaced during this movement and this in turn depends upon the cross sectional area of the displacer, or of the body of mercury surrounding the displacer.

If the displacing member 14 is of uniform cross sectional area, as is shown in Fig. 1, and also as is the body of mercury 9, then above the base pressure, equal increments of pressure applied at 2 will result in equal increments of vertical motion of the rod 10. In Fig. 2 I have shown the displacer 15 as having a cross sectional area varying throughout its length, and the shape of the displacer may be such that a desired functional relation will exist between increments of applied pressure and increments of motion of the indicator. The interior wall of the mercury chamber 8 or of the mercury chamber 16 might equally well be shaped to accomplish this result, it only being necessary to vary the relation between displacer emersion and applied pressure.

In Fig. 2 I have shown in general a preferred arrangement wherein a base pressure would not be suppressed, but the indication or motion of the piston and the indicator member carried thereby would begin immediately upon an increase in pressure over atmospheric. In this arrangement the mercury-containing chamber 16 is rigidly fixed to the cylinder casing 3 (not shown) while the displacer 15 is raised or lowered to varying degrees of submersion in the mercury 17, through the medium of the extension 18 of the piston (not shown). At atmospheric pressure, the weight of the assembly comprising the piston 4, the extension 18, and the displacer 15 is such that the assembly rests at its lowest limit of travel wherein a desirable portion of the displacer 15 is immersed in the mercury. As the pressure increases above atmospheric, the assembly begins to move upwardly and the increasing emersion of the displacer from the mercury adds weight to the assembly to counterbalance the increase of pressure. In general, an arrangement such as shown in Fig. 1 would be used if an index were to be graduated for the indication of a pressure range of, say, 1290 to 1310 lb. per sq. in. gage, whereas the arrangement of parts shown in Fig. 2 would be used if the index were to be graduated from 0 to 1310 lb. per sq. in. gage.

I have found that upon a sudden change in applied pressure the movable parts may change position too quickly with a disturbing effect on the mercury or other parts, and that it is desirable to provide a dampening or dash-pot effect retarding without affecting the accuracy. To this end, I have shown in Fig. 1, a relatively thin fin 19 and in Fig. 2 a similar fin 20 which tends to slow down the motion of one of the members relative to the other.

So far I have described arrangements wherein the applied pressure is greater than that of the atmosphere. The applied pressure, however, may be of any value relative to the atmosphere. That is, either less than or greater than the atmosphere, and correspondingly, a differential wherein either or both of the pressures are different from that of the atmosphere, may be used. In Fig. 3, I have shown a piston construction wherein the motion of the piston rod 21 is in proportion to a differential pressure applied through the pressure connections 22 and 23 effective upon the area difference between that portion of the piston 25 and the piston rod 21 as at 24. Such a piston would be used in case the invention were used as a meter of the rate of flow of a fluid in connection with an orifice or similar obstruction to flow, whereby a known relation between rate of flow and differential pressure would be produced. In such a device, the displacer or wall of the mercury chamber could be so shaped that equal increments of flow would be indicated in equal increments on an index or chart, regardless of the functional relation existing between rate of flow and differential pressure.

In Fig. 4, I have shown a piston design wherein a single pressure relative to the atmosphere is effective against an annular area 26 from the pressure connection 27, and permits a much larger and stronger construction of the piston rod 28 for the same effective area as compared to the piston 4 of Fig. 1.

I have found, for the sake of accuracy, that it is desirable to minimize resistance to axial positioning of the piston 4 and to that end I preferably rotate the piston and the parts carried by it. In Fig. 1, I have shown attached to the lower part of the chamber 8, a gear wheel 29 rotated by a motor 30 through a pinion 31, in a manner such that axial positioning of the gear wheel 29 and the parts to which it is attached, may take place during rotation. A similar means of rotation is shown in part for Fig. 2 and, of course, may be equally as well applied to the construction of Figs. 3 and 4.

It will be apparent that other arrangements and shapes of displacing members may be used in connection with a displaceable liquid which may be other than mercury. Furthermore, that in place of the motor 30 for rotating the mercury container 8 or the displacer 15, I may employ oscillating or vibrating means, so long as such means serves to keep free for axial positioning the piston and parts carried thereby. The pressure or pressure differential to be measured may be any pressure above or below the atmosphere or relative to the atmosphere, and may be a pressure resulting, for example, from a temperature responsive element wherein variations in temperature result in variations in pressure which may be measured in terms of temperature.

I have described the piston 4 as close fitting at 5 but there may be a slight amount of leakage to the atmosphere, and this may be taken care of through a drain 47 open to the atmosphere. Similarly, I show drain connections 48 and 49 of Fig. 4 open to the atmosphere.

Having now described and illustrated a preferred form of embodiment of my invention, I desire it to be understood that I am not to be limited thereby, except as to the claims in view of prior art.

What I claim as new, and desire to secure by Letters Patent of the United States, is:

1. A pressure measuring device, comprising in combination, a cylinder having a pressure connection thereto, a piston adapted for axial positioning in said cylinder responsive to pressure variations in the cylinder, variable counterbalancing means for said piston comprising two members, one of the members positioned by said piston relative to the other member, one of said members having a chamber, a liquid in said chamber, the other of said members comprising a displacing member adapted to depend into said liquid an amount varying with the axial positioning of said piston, said displacing member provided with a fin submerged in the liquid and projecting radially beyond the lateral surface; means for rotating the piston and movable member, and means for indicating said axial positioning, said displacing member being so shaped that equal increments of pressure applied to said piston result in equal increments of motion of said indicating means.

2. A pressure measuring device, comprising in combination, a cylinder opening at one end into a chamber and at the other end to the atmosphere, the chamber having a pressure connection thereto, a piston extending through and closely fitting the cylinder and adapted for axial positioning in the cylinder responsive to pressure variations in the chamber, an extension to said piston passing through one end of the cylinder to the atmosphere and having a second chamber, a liquid in the second chamber, a fixed displacer adapted to depend into the liquid an amount varying with the axial positioning of said piston, means for rotating the piston and second chamber, and means for indicating the axial position of the second chamber.

3. A pressure measuring device, comprising in combination, an open movable liquid-containing chamber of material weight and having a depending axial extension forming a piston, means for applying pressure to said piston tending to produce axial movement of said chamber, the weight of said chamber and liquid producing a constant force acting against the force produced by the pressure applied to said piston to prevent axial motion of said chamber until said pressure obtains a predetermined magnitude, and a stationary displacer depending into said liquid a varying amount in accordance with the axial movement of said piston, whereby after the force produced by said weight has been exceeded by the pressure, the axial positioning of said chamber is proportional to the magnitude of the applied pressure.

4. A pressure measuring device, comprising in combination, a movable open liquid-containing chamber having a depending axial extension forming a piston, an abutment against which said chamber normally rests, means for applying pressures to said piston, the weight of said chamber and contained liquid acting to prevent axial motion relative to said abutment until the pressure applied to said piston is of a predetermined magnitude, a displacer depending into said liquid in amount varying with position of said chamber, whereby the position of said chamber relative to said abutment is proportional to the magnitude of the pressure applied to said piston, and means for rotating said chamber and piston.

5. A pressure measuring device comprising in combination, a cylinder having a pressure connection thereto, a piston adapted for axial positioning in said cylinder responsive to pressure variations in the cylinder, variable counter-balancing means for said piston comprising two members, one of the members positioned by said piston relative to the other member, one of said members having a chamber, a liquid in said chamber, the other of said members comprising a tubular displacing member adapted to depend into said liquid an amount varying with the axial positioning of said piston, the submerged end of said displacer provided with a fin projecting radially beyond the lateral surface of said displacer whereby relative movement between said members is retarded, means for rotating the piston and one of said members, and means for indicating said axial positioning, said displacing member being shaped to produce a desired functional relation between equal increments of pressure applied to said piston and resulting increments of motion of said indicating means.

6. A pressure measuring device, comprising in combination, a cylinder having a pressure connection thereto, a piston adapted for axial positioning in said cylinder responsive to pressure variations in the cylinder, variable counter-balancing means for said piston comprising two members, one of the members positioned by said piston relative to the other member, one of said members having a chamber, a liquid in said chamber, the other of said members comprising a displacing member adapted to depend into said liquid an amount varying with the axial positioning of said piston, said piston provided with a fin submerged in the liquid and projecting radially beyond the lateral surface of the displacer; means for rotating the piston and movable member, and means for indicating said axial positioning, said displacing member having a shaped contour whereby movements of said displacer bear a functional non-linear relation to changes in pressure applied to said piston.

7. A pressure measuring device, comprising in combination, a chamber having a pressure connection thereto, a piston extending into said chamber, said piston provided with a tail-piece of smaller diameter extending externally of said chamber, said piston adapted for axial positioning responsive to pressure variations in the chamber, a second chamber movable by said piston, a liquid in the second chamber, a fixed displacer adapted to depend into the liquid an amount varying with the axial positioning of said piston, means for rotating the piston and said second chamber, and means for indicating the axial positioning of the second chamber.

8. A pressure measuring device comprising in combination, a chamber having a pressure connection thereto, a piston extending into said chamber, said piston provided with a tail-piece of smaller diameter extending externally of said chamber, said piston adapted for axial positioning responsive to pressure variations in the chamber, a displacer movable by said piston, an open stationary liquid containing chamber, said displacer depending into said liquid a varying amount and having a shaped contour whereby movements of said displacer bear a functional non-linear relation to changes in pressure applied to said piston, and means for rotating said piston and said displacer.

9. A pressure measuring device, comprising in combination, a cylinder having a pressure connection thereto, a piston adapted for axially positioning in said cylinder responsive to pressure variations in the cylinder, variable counterbalancing means for said piston comprising two members, one of the members positioned by said piston relative to the other member, one of said members having a chamber, a liquid in said chamber, the other of said members comprising a tubular displacing member adapted to depend into said liquid an amount varying with the axial positioning of said piston, the submerged end of said displacer provided with a fin projecting radially beyond the lateral surface of said displacer whereby relative movement between said members is retarded, a constant speed separately energized motor for rotating the piston and one of said members, and means for indicating said axial positioning, said displacing member being shaped to produce a desired functional relation between equal increments of pressure applied to said piston and resulting increments of motion of said indicating means.

10. A pressure measuring device, comprising in combination, an open movable liquid-containing chamber of material weight and having a depending axial extension forming a piston, a gear wheel attached to said chamber, a pinion meshing with said gear, a constant speed separately energized motor for rotating said pinion, means for applying pressure to said piston tending to reduce axial movement of said chamber, the weight of said chamber and liquid producing a constant force acting against the force produced by the pressure applied to said piston to prevent axial motion of said chamber until said pressure obtains a predetermined magnitude, and a stationary displacer depending into said liquid a varying amount in accordance with the axial movement of said piston, whereby after the force produced by said weight has been exceeded by the pressure, the axial positioning of said chamber is proportional to the magnitude of the applied pressure.

CLARENCE JOHNSON.